UNITED STATES PATENT OFFICE 2,382,185

NITROGENOUS CONDENSATION PRODUCTS OF ALKYLENE IMINES

Heinrich Ulrich, Ludwigshafen-on-the-Rhine, Germany, assignor, by mesne assignments, to General Aniline & Film Corporation, New York, N. Y., a corporation of Delaware No Drawing. Application December 12, 1940, Serial No. 369,867. In Germany August 7, 1935

3 Claims. (Cl. 260—239)

The present application is a continuation-in-part of application Ser. No. 93,767, filed in the name of Heinrich Ulrich on August 1, 1936, now Patent No. 2,272,489, granted February 10, 1942.

The present invention relates to new nitrogenous condensation products.

I have found that very valuable nitrogenous products are obtained by causing 1.2-alkylene imines (ethylene imines) or the non-crystalline high molecular products obtainable therefrom by polymerization to react with carboxylic acids, their anhydrides or esters. It makes no substantial difference in the course of the reaction whether the monomeric imines or their non-crystalline polymerization products are employed. The latter are preferably obtained by catalytic polymerization according to U. S. Patent 2,182,306. These products have a molecular weight which is more than three times that of the monomeric imines; they are not so thinly liquid as the monomeric compounds but from viscous to waxy products. Most probably they are mixtures of polymers of different degree of polymerization. For example ethylene imine, methylethylene imine, alpha-beta-butylene imine, alpha-beta-dodecylene imine and their non-crystalline polymerization products of any desired degree of polymerization are suitable for the process.

The 1.2-alkylene imines may be caused to react for example with fatty acids, such as stearic acid, oleic acid, the fatty acids present in palm kernel oil and coconut oil, furthermore maleic acid, hydroaromatic or heterocyclic carboxylic acids. Instead of the free acids their anhydrides or esters may also be employed. Esters of chlorocarbonic acid may be employed with advantage.

The reaction conditions are adapted to the initial materials employed. The reaction usually takes place at temperatures between room temperature and 100° C., as for example at from 50° to 60° C., but higher or, in the case of especially reactive initial materials, lower temperatures may be advantageous. Equimolecular proportions of the initial materials may be allowed to react with each other or the 1.2-alkylene imines may be employed in excess. Depending on the nature and relative proportions of the initial materials, and in some cases on the reaction conditions, products which are soluble or insoluble in water can be obtained. The use of solvents or diluents, as for example water, alcohol, ether, cyclohexanone, toluene, carbon tetrachloride or chlorbenzene is frequently of advantage. The reaction may be carried out under increased pressure; especially when initial materials are employed which react only with difficulty it is preferable to carry out the condensation in a closed vessel under pressure. It may be advantageous to work in the presence of condensing agents. An addition of natural or synthetic resins is also frequently of advantage during the condensation.

It may be of advantage to condense the alkylene imines simultaneously with two or more of the said compounds or first with one of the said compounds, the reaction product being condensed with another reactive substance. Products which are still basic may be employed in the form of salts with mineral or organic acids, as for example with fatty acids.

The condensation products of 1.2-alkylene imines with the carboxylic acid substances may be subsequently alkylated or peralkylated or substituents, as for example carboxylic, sulphonic, sulphuric ester or phosphoric acid groups, may be introduced. The introduction of substituents may also be effected by employing, for the reaction with the alkylene imines, compounds which already contain the desired substituents. By condensation for example with chlorocarbonic acid esters, the condensation products may be converted into bodies similar to urethanes. Furthermore two or more of the said methods of treatment may be combined together or carried out consecutively.

The products obtainable according to this invention are colorless or slightly colored viscous liquid, or wax-like, or solid substances many of which are difficultly soluble or insoluble in water but soluble in organic solvents, the nature of the products obtained depending on the initial materials and working conditions employed.

The products are suitable for a great variety of purposes; for example they may serve alone or together with other suitable substances as assistants for the pharmaceutical, cosmetic, textile, leather, lacquer, rubber and like industries. For example they may be added with advantage to the spinning baths in the preparation of artificial silk; they increase the affinity of artificial silk to acid dyestuffs. The products may also be employed as additions in dyeing, printing, dressing, stripping, fulling, levelling, washing, dispersing and wetting or as softening or flotation agents. Some of the products impart a water-repelling action to textiles treated therewith. They increase the fastness to water and washing of dyeings. The condensation products may also be employed in tanning. In many cases it is preferable to employ the products in a dissolved or dispersed form, for example while employing dispersing agents, as for example salts of the sulphuric esters of fatty alcohols or true sulphonic acids of aliphatic compounds of high molecular weight.

The following examples will further illustrate the nature of this invention but the invention is not restricted to these examples. The parts are by weight.

Example 1

43 parts of water-soluble polymerized ethylene imine and 25 parts of the mixture of the chlorocarbonic acid esters of the alcohols corresponding to the fatty acids contained in palm kernel oil are heated at from about 50° to 60° C for three hours while stirring. As soon as a sample withdrawn from the reaction mixture is soluble in water to give a clear solution, the reaction is interrupted.

Aqueous solutions of the reaction product thus obtained have an excellent washing action even in acid and neutral media.

Example 2

225 parts of stearic acid anhydride are condensed with 86 parts of water-soluble polymerized ethylene imine. The reaction products are readily colloidally dispersible in water and may be employed as emulsifying agents.

Instead of stearic acid anhydride cetyl chlorocarbonic ester may be used.

Water-insoluble polymerized ethylene imine may also be used instead of the water-soluble product.

Example 3

622 parts of the product obtainable according to the first paragraph of the preceding example is brought into reaction with 94 parts of chloracetic acid or 118 parts of succinic acid or 72 parts of acrylic acid. The products thus obtained are soluble in dilute acids and alkali hydroxide solutions.

Example 4

440 parts of solid or liquid polymerized ethylene imine are reacted with 200 parts of chloroacetic acid. The compound obtained may be employed for example for the absorption of acid gases.

Dichloroacetic acid, bromoacetic acid, bromostearic acid and the like may be employed instead of chloroacetic acid.

By treatment with alkyl halides alkyl groups may be introduced into the molecule of the compounds thus obtainable.

Example 5

116 parts of maleic acid are condensed with polymeric ethylene imine. A valuable artificial mass is formed by the reaction which is accompanied by the evolution of heat.

Example 6

The product obtained according to Example 1 or a urethane-like product prepared therefrom is heated with the equivalent amount or a multiple of the equivalent amount of chloracetic acid or chloracetic acid ester. The resulting products may be used for various kinds of textile improvement.

Example 7

A product prepared according to Example 1 is treated with chlorsulphonic acid or phosphorus oxychloride, whereby a readily water-soluble product is obtained which may be used as an addition for baths for the treatment of textiles.

What I claim is:

1. Nitrogenous condensation products obtained by condensing a member selected from the class consisting of monomeric 1,2-alkylene imines and their non-crystalline high molecular polymerization products with a chlorocarbonic acid ester of a higher aliphatic alcohol.

2. Nitrogenous condensation products obtained by condensing a member selected from the class consisting of monomeric 1,2-alkylene imines and their non-crystalline high molecular polymerization products with cetyl chlorocarbonic ester.

3. Nitrogenous condensation products obtained by condensing a member selected from the class consisting of monomeric 1,2-alkylene imines and their non-crystalline high molecular polymerization products with a mixture of the chlorocarbonic acid esters of the alcohols corresponding to a mixture of naturally occurring higher fatty acids.

HEINRICH ULRICH.